United States Patent [19]

Murphy

[11] Patent Number: 5,594,818
[45] Date of Patent: Jan. 14, 1997

[54] DIGITAL OPTICAL SWITCH AND MODULATOR AND A METHOD FOR DIGITAL OPTICAL SWITCHING AND MODULATION

[75] Inventor: Edmond J. Murphy, Bethlehem, Pa.

[73] Assignee: Lucent Technologies Inc., Murray Hill, N.J.

[21] Appl. No.: 399,082

[22] Filed: Mar. 8, 1995

[51] Int. Cl.$^6$ .................................................. G02F 1/295
[52] U.S. Cl. ............................................................. 385/8
[58] Field of Search ................................. 385/2, 8, 16, 3, 385/21, 20, 40, 41, 14, 42, 131, 132; 437/15, 16, 20, 21, 28, 36, 50, 51, 116, 126, 128, 129, 134, 141, 164, 192

[56] References Cited

U.S. PATENT DOCUMENTS

| 4,127,320 | 11/1978 | Li .......................................... 385/16 X |
| 4,198,116 | 4/1980 | Papuchon .............................. 385/16 X |
| 4,679,893 | 7/1987 | Ramer ...................................... 385/9 |
| 5,148,503 | 9/1992 | Skeie .......................................... 385/3 |
| 5,148,507 | 9/1992 | Tanisawa ............................... 385/16 X |
| 5,185,830 | 2/1993 | Nishimoto ............................. 385/16 X |
| 5,303,315 | 4/1994 | Granestrand ............................. 385/16 |

OTHER PUBLICATIONS

"Shaping the Digital Switch" By Burns IEEE Photonics Technol. Letters.4(8):861–863 Aug. 1992.
"Reduction of voltage–length product for Y branch Digital Optical Switch" By Pkayama et al. J.Lightwave Technol. 11(2):379–387 Feb. 1993.

Burns, W. K., "Shaping the Digital Switch," *IEEE Photonics Technol. Letts.* 4 (8):861–863 (Aug. 1992).
Granestrand, P. et al., "Pigtailed Tree–Structured 8×8 LiNbO$_3$ Switch Matrix with 112 Digital Optical Switches," *IEEE Photonics Technol. Letts.* 6 (1):71–73 (Jan. 1994).
Marcuse, Dietrich, "Optimal Electrode Design for Integrated Optics Modulators," *IEEE J. Quantum Electronics* QR–18 (3):393–398 (Mar. 1982).
Okayama, H., et al., "Y–Fed Directional Coupler With Weighted Coupling," *Electronics Letts.* 27 (21):1947–1948 (10th Oct. 1991).
Okayama, H., et al., "Redution of Voltage–Length Product for Y–Branch Digital Optical Switch," *J. Lightwave Technol.* 11 (2):379–387 (Feb. 1993).
Okayama, H., et al., "Ti : LiNbO$_3$ Digital Optical Switch Matrices," *Electronics Letts.* 29 (9):765–766 (29th Apr. 1993).
Silberberg, Y., et al., "Digital optical switch," *Appl. Phys. Lett.* 51 (16):1230–1232 (19 Oct. 1987).

Primary Examiner—Akm E. Ullah

[57] ABSTRACT

A digital optical switch and a method for digital optical modulation are disclosed. The digital optical switch is comprised of an optical waveguide having an input control region, a connection region, and a separation region, and a generator which generates a smoothly varying electric field in an input control region of said optical waveguide and a substantially constant electric field in said separation region of said optical waveguide. The optical waveguide may be either an x-shaped optical waveguide or a y-shaped optical waveguide.

11 Claims, 7 Drawing Sheets

DIGITAL OPTICAL SWITCH AND MODULATOR AND A METHOD FOR DIGITAL OPTICAL SWITCHING AND MODULATION

BACKGROUND OF THE INVENTION

1. Field of the Invention

The present invention relates generally to optical switches and modulators, and more particularly to an electrode configuration for controlling the electric field applied to an optical waveguide in optical switches and modulators.

2. Related Art

Certain types of waveguide based optical switches, also referred to as optical modulators, are receiving a great deal of attention due to their digital optical output characteristic. These waveguide based optical switches can be controlled through the electro-optic effect. The electro-optic effect is a term used to describe the change in the index of refraction of an optical waveguide that results from an electric field applied through the optical waveguide. Changes in the index of refraction of an optical waveguide affect the propagation of light through the optical waveguide. For example, a change to the index of refraction of an optical waveguide may direct light to propagate in an optical waveguide. Alternatively, a change in the index of refraction of an optical waveguide may direct light away from propagating in an optical waveguide. For a properly designed switch, application of a control voltage, therefore, can cause the optical waveguide to exhibit a digital response function. That is, the optical output power of an optical waveguide yields a step-like curve when it is plotted against increasing control voltage, that is, there are no significant secondary maxima in such a plot.

An advantage of a digital response characteristic is that the switch can be set to direct an optical signal to a given output waveguide without regard to the polarization of the input signal despite the fact that the electro-optic effect is different for the two polarizations. Another advantage of a digital response characteristic is that the output optical power of the optical waveguide is not sensitive to voltage variations or drift in the applied control voltage. Application of an appropriate control voltage allows light to be routed through a desired path of all optical switch. Routing light ill this manner is called switching. When an appropriate control voltage is applied to each of two output waveguides, propagation of light is promoted in one of the output optical waveguides and propagation or light is inhibited in the other output optical waveguide. Optical switches have broad optical bandwidths making them attractive for the switching needs of high data rate transmission systems, including space- and time-division multiplexing. In addition, optical switches may find application in other areas such as optical signal processing. An optical modulator functions much the same as all optical switch because the optical output power in either of the output optical waveguides can be modulated by an appropriate control voltage.

Optical switches have been implemented using x- or y-shaped optical waveguides. A y-shaped optical waveguide consists of three optical waveguides: one input optical waveguide connected to two output optical waveguides. The input waveguide is connected to the output waveguides at an optical waveguide branch start plane. All x-shaped optical waveguide consists of four optical waveguides: two input optical waveguides connected to two output optical waveguides. The input waveguides connect to the output waveguides at an optical waveguide branch start plane. The terminology, "x-shaped" and "y-shaped", is used as a shorthand to describe the multiple waveguides which form an x-shaped or y-shaped optical waveguide respectively. The terms are descriptive of the shapes of the resulting waveguides. Optical switches using all x- or y-shaped optical waveguide exhibit the highly desirable digital behavior described above. Thus, the voltage transfer characteristic of optical switches made using x- or y-shaped optical waveguides looks like a step function.

X- and y-shaped optical waveguides may be manufactured using a birefringent material such as lithium niobate ($LiNO_3$). A birefringent material causes different polarizations of light to behave differently when they propagate through it. A light beam that is propagating through a waveguide of an optical switch comprises two polarizations (see FIG. 2): a transverse magnetic polarization (TM) 202 and a transverse electric polarization (TE) 204. The two polarizations may be defined anywhere in the plane which forms a right angle to the direction of propagation of light through an optical waveguide. In the field of waveguide devices, axes are conventionally defined with respect to the top surface of the crystal substrate in which the optical waveguide resides. Light with a transverse electric polarization is defined as light having an electric field vector parallel to the top surface of the crystal substrate. In TE polarized light 204, the magnetic field vector, which is perpendicular to the electric field vector, is perpendicular to the top surface of the substrate. Likewise, light with a TM polarization 202 is defined as light having a magnetic field vector parallel to the top surface of the crystal substrate in which the optical waveguides resides. In TM polarized light 202, the electric field vector, which is perpendicular to the magnetic field vector, is perpendicular to the top surface of the crystal substrate.

Figure 2A:
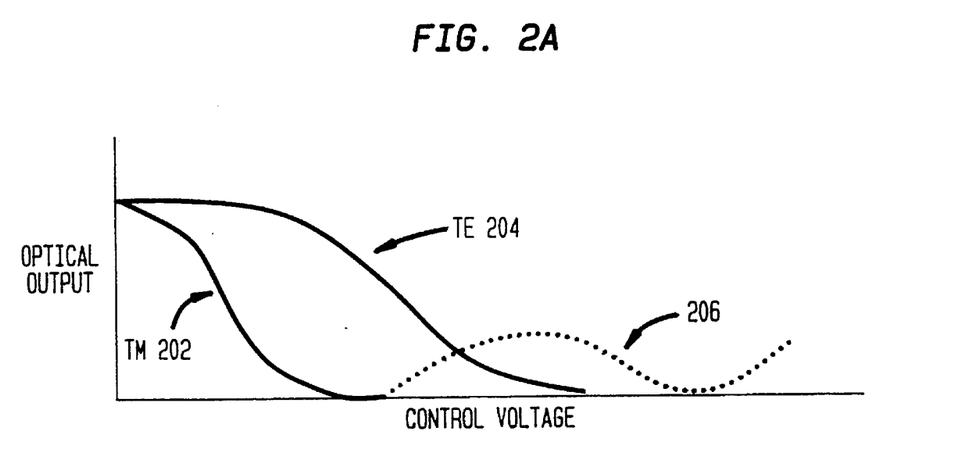
FIG. 2 illustrates an example conventional or prior art response function of an optical switch to which an electric field is applied.
Figure 2B:
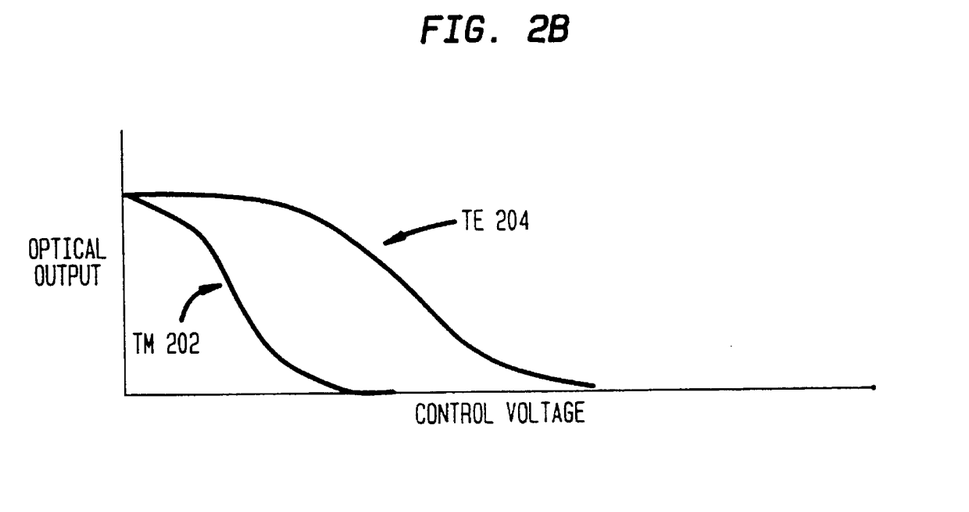
FIG. 2B illustrates an example response function for a digital optical switch to which an electric field is applied.

In order to obtain a digital response function for a polarization independent switch, the power of both the TM and TE polarizations of light 202,204 in a waveguide of an optical switch must be reduced to as near zero as possible. FIG. 2 shows exemplary optical transfer curves for prior art directional coupler switches in z-cut lithium niobate. In order to reduce the power of both the TM and TE polarizations of light 202,204 to as near zero as possible, an increasing control voltage must be applied to the waveguide. Power in the TM polarization of light 202 approaches zero faster than the TE polarization of light 204 (this is apparent from FIG. 2). Therefore, a greater control voltage must be applied to an optical waveguide to reduce the power in the TE polarization of light 204 to zero than need be applied to reduce the TM polarization of light 202 to zero. As greater voltage is applied to the optical waveguide to reduce the TE polarization 204 to zero, the TM polarization 202 rises (see example rise 206 in FIG. 2). The rise 206 in the TM polarization of light 202 results in crosstalk. Crosstalk refers to unwanted power which appears at the output of one optical waveguide when an electric field has been applied to the switch to direct the optical power to the other output optical waveguide. X- and y-shaped optical waveguides are advantageous because they reduce the rise 206 in the power of the TM polarization of light 202 as the control voltage is increased (see FIG. 2B). Optical switches using x- or y-shaped designs, therefore, reduce crosstalk and signal-to-noise problems associated with other kinds of optical switches which do not use x- or y-shaped designs.

Typically, single mode optical waveguides are used in optical switches. A mode refers to the distribution of the light across the width of an optical waveguide. A single mode optical waveguide has a width sufficient to support only a single mode of light propagating thorough it. The mode supported in a single mode optical waveguide appears at the end of the waveguide as a single spot of light. In a multiple mode optical waveguide, the width of the optical waveguide is sufficient to support multiple modes of light. In a multiple mode optical waveguide, multiple spots of light appear at the output of the waveguide. In a single mode x- or y-shaped optical switch, only one mode of light is supported in the optical waveguide of the optical switch. An exception occurs where the x- or y-shaped optical waveguide begins to branch. Two modes are possible at this point because of the larger width of the waveguide where it begins to branch.

Switching occurs in the active region of an x- or y-shaped optical waveguide. The active region of an x- or y-shaped optical waveguide begins in the region where the x- or y-shaped optical waveguide begins to branch (i.e., where the input waveguide(s) connect to the output waveguides) and extends to the end of the electrodes. Applying an electric field across the branches (the separation or split in a x- or y-shaped optical waveguide) of an x- or y-shaped optical waveguide changes the index of refraction in those branches (changing the index of refraction in an x- or y-shaped optical waveguide causes propagation of light in the branches of the x- or y-shaped optical waveguide to be inhibited or promoted). The electric field can be applied such that one branch of an x- or y-shaped optical waveguide promotes propagation of light through it, while the other branch of an x- or y-shaped optical waveguide inhibits propagation of light through it. The branches of an x- or y-shaped optical waveguide are coupled. That is, the power of the light in the inhibiting branch of the waveguide is transferred to the light in the promoting branch such that the promoting branch contains all of the power of the original input light.

An x-switch provides more flexibility in switching than a y-switch because it is a 2×2 switch whereas the y-switch is a 1×2 or 2×1 switch. A 2×2 switch has two inputs and two outputs. The flexibility of the 2×2 switch derives from its ability to rout either input to either output. Because the x-switch is difficult to design however, the less flexible 2×1 or 1×2 y-shape design is more common. However, the following discussion about the design of the electrodes apply to an x- switch as well as a y-switch.

Digital optical switches have different electrode and optical waveguide configurations depending on, among other things, the type of crystal substrate from which the electrodes are made. In lithium niobate, the largest electro-optic effect is obtained for electric fields which are parallel to the crystalline z-axis. Thus, for optical waveguides fabricated in x- or y-cut crystalline material, the electrode are placed on the substrate surface adjacent to the waveguides. The waveguides and electrodes are oriented such that the applied electric field is primarily parallel to the surface of the substrate and in the z direction where it passes through the waveguides. For optical waveguides fabricated in z-cut crystalline material, the electrodes are placed in a plane, parallel to and distinct from a plane in which the waveguides are located so that the applied electric field is primarily perpendicular to the surface and in the z direction where it passes through the waveguides.

For digital switches, a first conventional electrode waveguide configuration is a two electrode design. The two electrodes follow the branching of the output waveguides, resulting in a non-constant distance between electrodes as the waveguides branch. The effect of the non-constant distance along the length of the optical switch is that the electric field, which is proportional to applied voltage (V) divided by the distance between the electrodes at a particular point (L), decreases in intensity as L increases. Thus, the waveguides become inefficient very quickly as they separate, that is, as L increases. A further disadvantage of the first conventional electrode configuration is that advantageous voltage-length reduction techniques, such as one described in W. K. Burns, "Shaping the Digital Switch," *IEEE Photonics Technology Letters*, Vol. 4., pp. 861–863, August 1992, hereby incorporated by reference in its entirety, cannot be applied because such techniques require the application of a constant electric field.

A second conventional electrode waveguide configuration uses a four electrode design. This configuration maintains a constant separation between pairs of electrodes, thereby overcoming the problem of the V/L inefficiency, described above, for the two electrode design. However, this second conventional electrode configuration suffers from other problems. In particular, there is a practical limit as to how close the inner two electrodes can get. The limit is imposed by the resolution of modern photolithographic processes used to create the electrodes. Further, arcing across the point of closest proximity (between the innermost 2 electrodes) becomes a problem when the electric field intensity is sufficiently high. Thus, the electrodes do not extend into the input region of the optical switch. Light propagating in the optical waveguide of an optical switch which employs the second conventional electrode configuration, experiences an abrupt change in the electric field applied to the optical switch at the beginning of the electrodes. An abruptly applied electric field results in increased crosstalk and propagation disturbance in the optical waveguide. Preferably, the electric field should be applied in a smoothly varying way so as to minimize crosstalk and disturbance of mode propagation.

Therefore, what is required is an optical switch having an electrode configuration that overcomes the above-stated problems. The new electrode configuration should apply a constant electric field through a substantial portion of the separation of the output branches (i.e., the branches through which light propagates after switching) of the optical waveguide. Also, the electrodes in the new electrode configuration should control the application of the electric field to provide a smooth application of the electric field without abruptly turning it on or off. The electrode configuration should begin application of the electric field in an input control region of the optical switch.

SUMMARY OF THE INVENTION

The present invention relates to optical switches, or optical modulators, for use in applications requiring high optical bandwidths such as high data-rate transmission systems. The optical switch of the present invention has several features providing distinct advantages over the prior art.

First, spacing between the electrodes of the optical switch remains substantially constant over a substantial portion of the region in which the optical waveguide, contained in the optical switch, branches. This substantially constant spacing assures that the electrode configuration of the present invention applies a substantially constant controlling electric field to the optical waveguide contained in the optical switch.

Second, the spacing between the electrodes of the optical switch varies at the input of the optical waveguide to provide for a smooth turn on of the controlling electric field.

Third, the design of the present invention allows the extension of the electric field to a point prior to the input control region of the optical waveguide in the optical switch. This extension of the electric field provides for better control and reduction of crosstalk in the optical waveguide by allowing application of a smooth electric field as soon as the waveguide is wide enough to support more than one mode.

Fourth, the electrode configuration of the present invention is conservatively designed, with respect to modern photolithographic methods, and therefore is not more difficult to manufacture than prior art designs.

Fifth, the electrode design of the current invention allows for adoption of voltage-length reduction techniques for z-cut lithium niobate such as one described in W. K. Burns, "Shaping the Digital Switch," *IEEE Photonics Technology Letters,* Vol. 4., pp. 861–863, August 1992. This technique was previously believed to only be applicable to x- or y-cut lithium niobate due to ease of placing the electrodes around the optical waveguide to provide a constant electric field to the branches of the waveguide.

Sixth, displacement of the edges of the waveguide from the edges of the overlying electrodes optimizes application or the electric field to the waveguide. The theory for optimizing this position is described in Marcuse, "Optimal Electrode Design for Integrated Optics Modulators," *IEEE Journal of Quantum Electronics,* Vol. QE-18, pp. 393–398, March 1982, hereby incorporated by reference in its entirety.

More particularly, the present invention is directed to a digital optical switch for use in high dam rate switching applications. The digital optical switch comprises an optical waveguide having an input control region, a connection region, a separation region, and a turn off region. The optical waveguide is positioned in a first plane. An electrode configuration is positioned in a second plane. The second plane is distinct from and substantially parallel to the first plane. The electrode configuration controls light propagating through the optical waveguide of the optical switch by applying a controlling electric field to the optical waveguide. The electrode configuration applies a smoothly increasing electric field from the input control region of the optical waveguide to the separation region of the optical switch. The electrode configuration applies a substantially constant electric field in the separation region of the optical waveguide.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

Figure 1A:
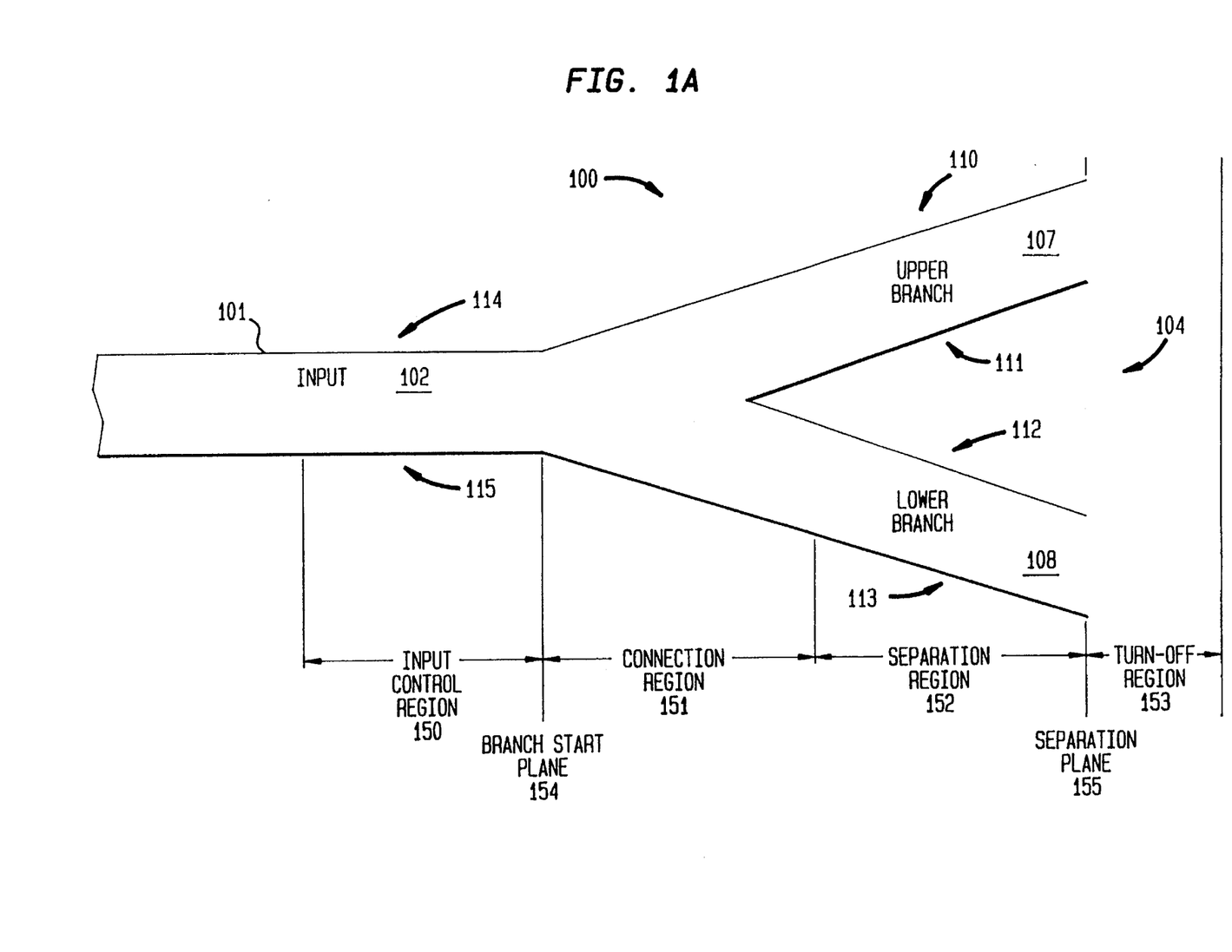
FIG. 1A illustrates a y-shaped optical waveguide.
Figure 1B:
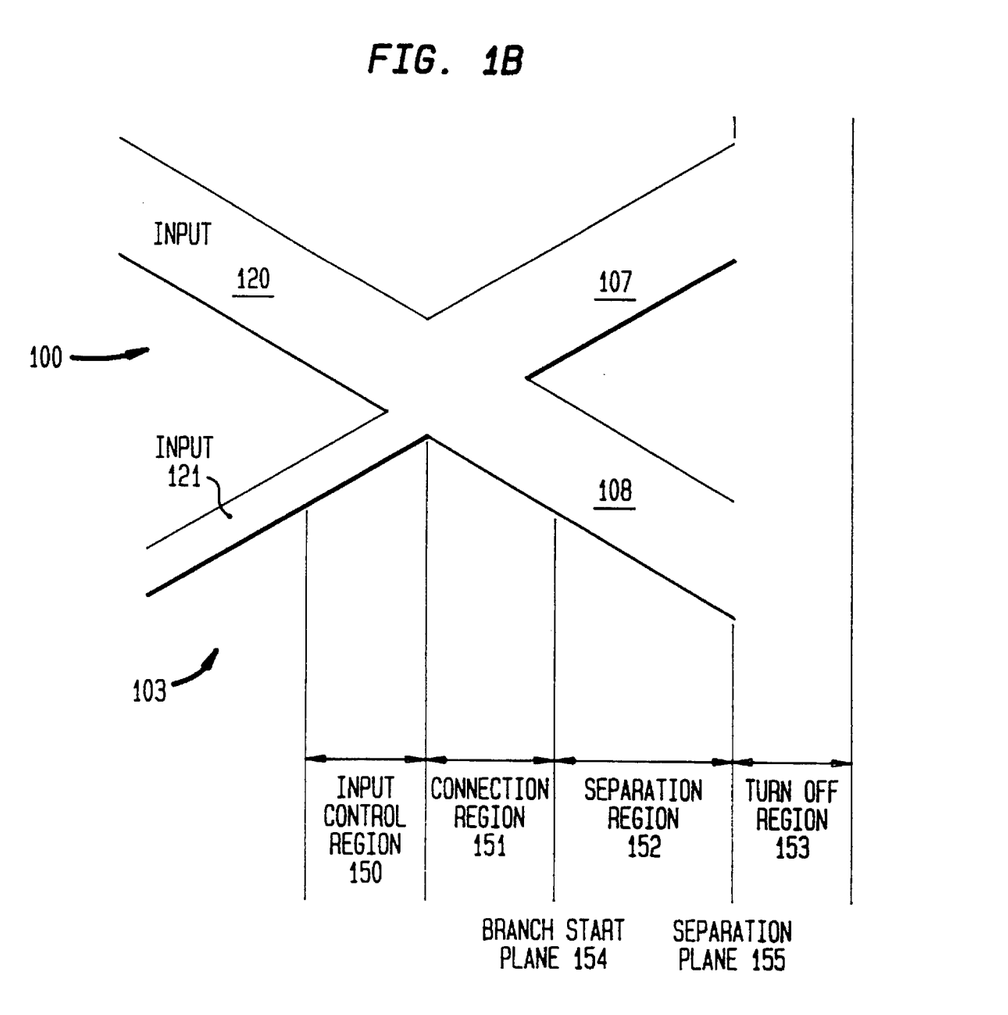
FIG. 1B illustrates an x-shaped optical waveguide.
Figure 5A:
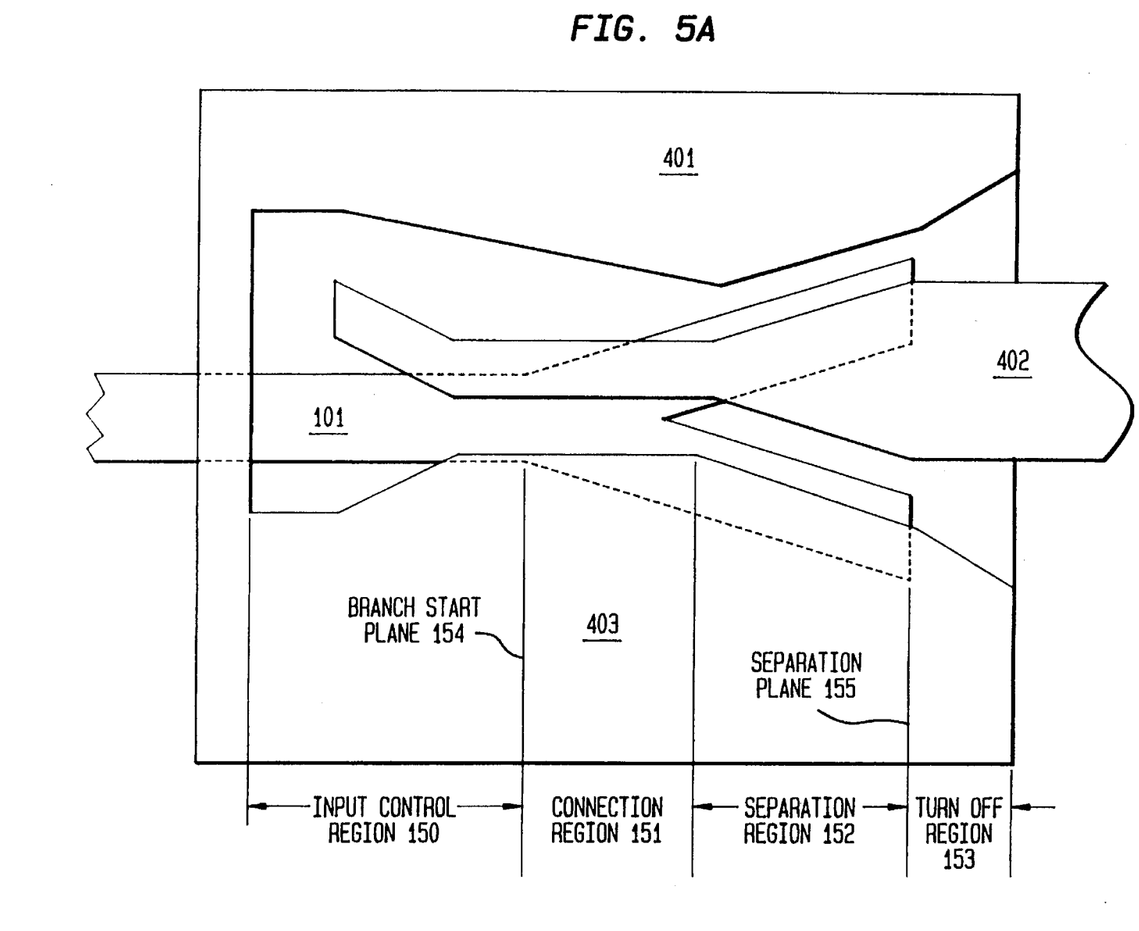
FIG. 5A illustrates an optical switch according to a preferred embodiment of the present invention using a y-shaped optical waveguide.
Figure 5B:
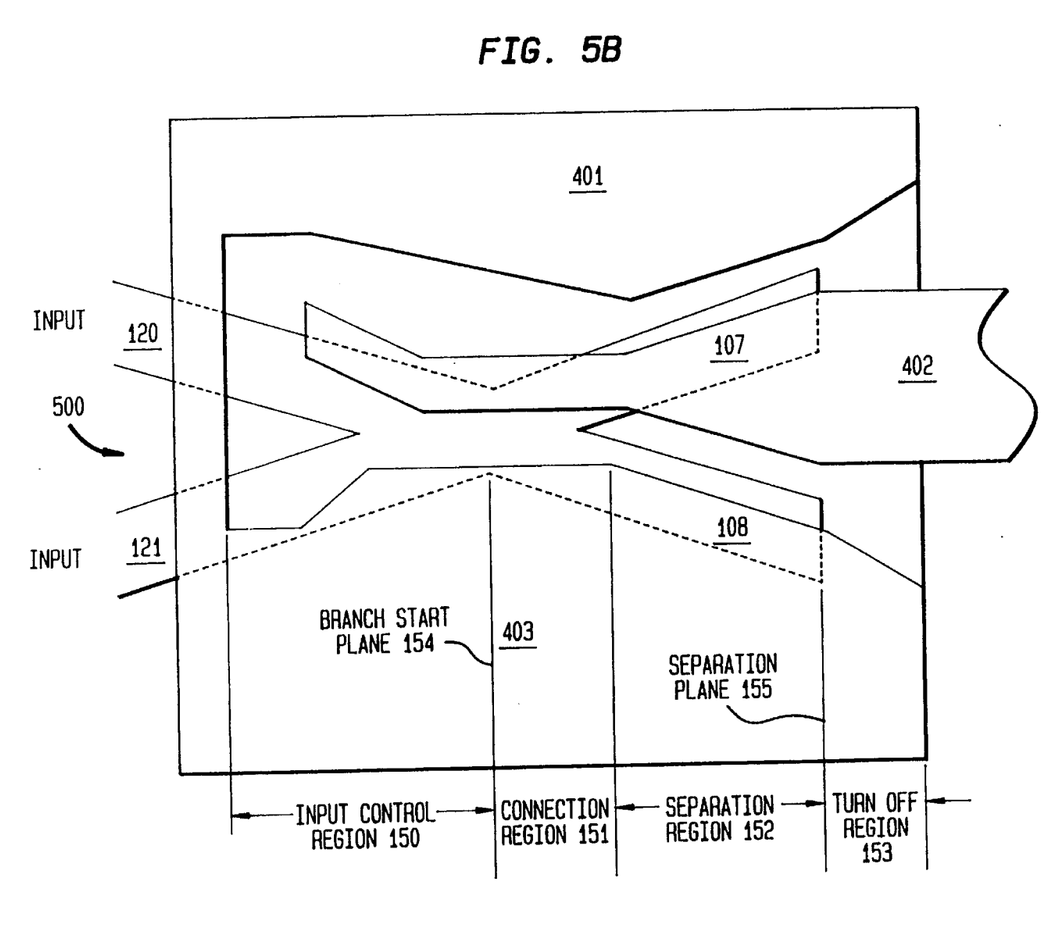
FIG. 5B illustrates an optical switch according to a preferred embodiment of the present invention using an x-shaped optical waveguide.

Optical switches use optical waveguides 100 (shown in FIGS. 1A and 1B) in which light may be propagated to one of several outputs. In a preferred embodiment of the present invention, the optical switch comprises a y-shaped optical waveguide 101 as shown in FIG. 1A. In a second preferred embodiment of the present invention, the optical switch comprises an x-shaped optical wave guide 103 shown in FIG. 1B. An alternate embodiment of the present invention using an x-shaped optical waveguide is shown in FIG. 5B. An x-shaped optical waveguides comprises 2 input waveguides 120 and 121. Note that the width of waveguide 120 is greater than the width of waveguide 121. The difference in widths reduces coupling between waveguides 120 and 121 because waveguides of different widths have different indices of refraction. As has been described, the index of refraction may be used to promote or inhibit the propagation of light in a waveguide.

According to a preferred embodiment of the present invention, the optical switch is fabricated by first forming an optical waveguide 100 in the substrate material. The optical waveguide 100 is then fabricated by first depositing a layer of titanium on z-cut lithium niobate. The titanium is them patterned using conventional photolithography and etching techniques. The resulting titanium pattern is diffused into the substrate to form the optical waveguide 100. According to a preferred embodiment of the present invention, a burlier layer is deposited on the substrate surface to separate optical fields in the waveguides from the electrode metal. Finally, the electrodes are fabricated on the buffer layer. They are aligned to the waveguides and are formed using conventional photolithography techniques and either conventional etching or plating techniques. Typically, waveguide and electrode dimensions and relative alignment must be controlled to +/−1 micron, an accuracy well within the range of standard processing techniques.

The remainder of the discussion is directed to a y-shaped optical waveguide 101, although an x-shaped optical waveguide 103 may alternatively be used. Preferably, the y-shaped optical switch 101 of the present invention uses a single mode optical waveguide.

A y-shaped waveguide 101 is presently described with reference to FIG. 1A. A y-shaped optical waveguide 101, used in a preferred embodiment of the present invention, comprises an input control region 150, a connection region 151, a separation region 152, and a turn off region 153. The y-shaped optical waveguide 101 further comprises an input 102, having an upper edge 114 and a lower edge 115. The y-shaped optical waveguide 101 further comprises an upper branch 107, having an upper edge 110 and a lower edge 111, and a lower branch 108, having an upper edge 112 and a lower edge 113. The point at which the y-shaped optical waveguide 101 begins to branch apart and separate is termed the branch start plane 154. The point where branches 107 and 108 of the y-shaped optical waveguide 101 are sufficiently separated such that they no longer interact is termed the separation plane 155.

Figure 3:
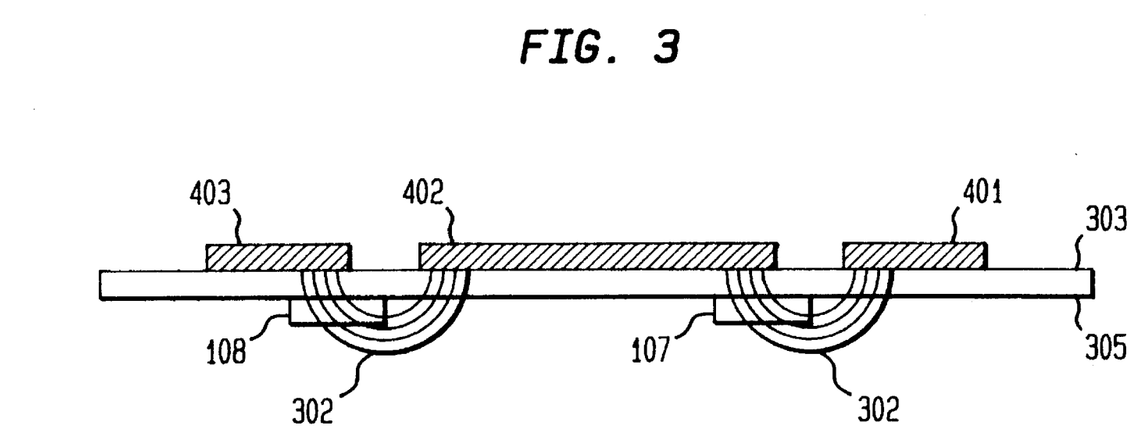
FIG. 3 illustrates an example electric field generated by an electrode configuration made using z-cut LiNO₃.
Figure 6:
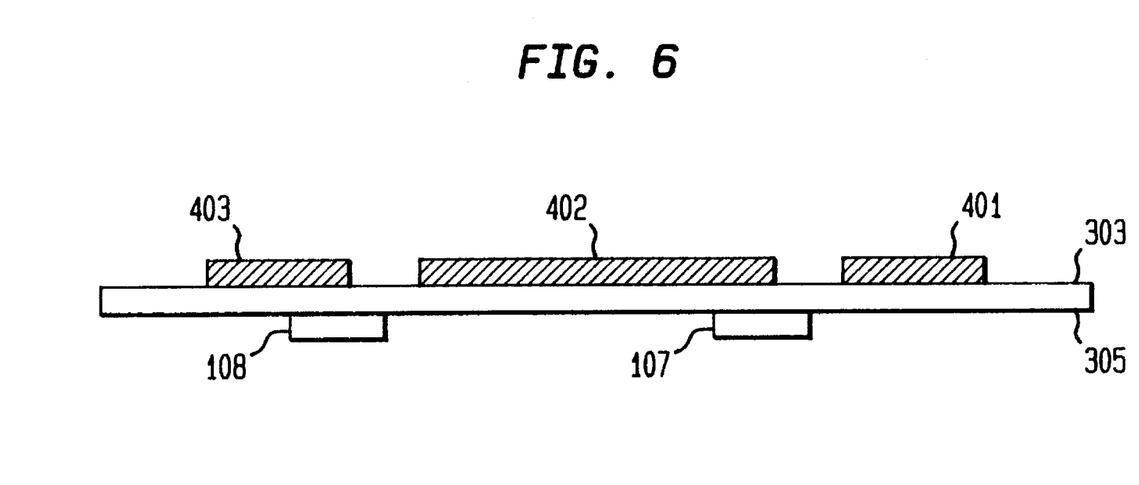
FIG. 6 illustrates a cross section of a preferred embodiment of the present invention showing the relative positioning between the electrodes and waveguides in a preferred embodiment of the present invention.

A preferred embodiment of the present invention comprises a y-shaped optical waveguide 101 in a first plane, termed the waveguide plane 303, as shown in FIG. 3, and an electrode configuration 400 positioned in a second plane, termed the electrode configuration plane 305, as shown in FIG. 3. The first plane, the waveguide plane 303, is distinct from and substantially parallel to the second plane, the electrode configuration plane 305. In particular, FIGS. 5A and 6 show a top view (FIGS. 5A and 5B) and a cross sectional view (FIG. 6, taken along cut line I in FIG. 5A) of an optical switch 500 according to a preferred embodiment of the present invention using a y-shaped optical waveguide 101 positioned in a first plane 303 and an electrode configuration 400 positioned in a second, distinct plane 305, substantially parallel to said first plane 303. FIG. 5A further illustrates the same regions, input control region 150, connection region 151, separation region 152, and turn off region 153 as previously described in FIG. 1A. In addition FIG. 5A illustrates the branch start plane 154 and separation plane 155, previously described in FIG. 1A. FIG. 5B illustrates an optical switch 500 according to a preferred embodiment of the present invention using an x-shaped optical waveguide. The following discussion of FIG. 5A also applies to FIG. 5B.

Figure 4:
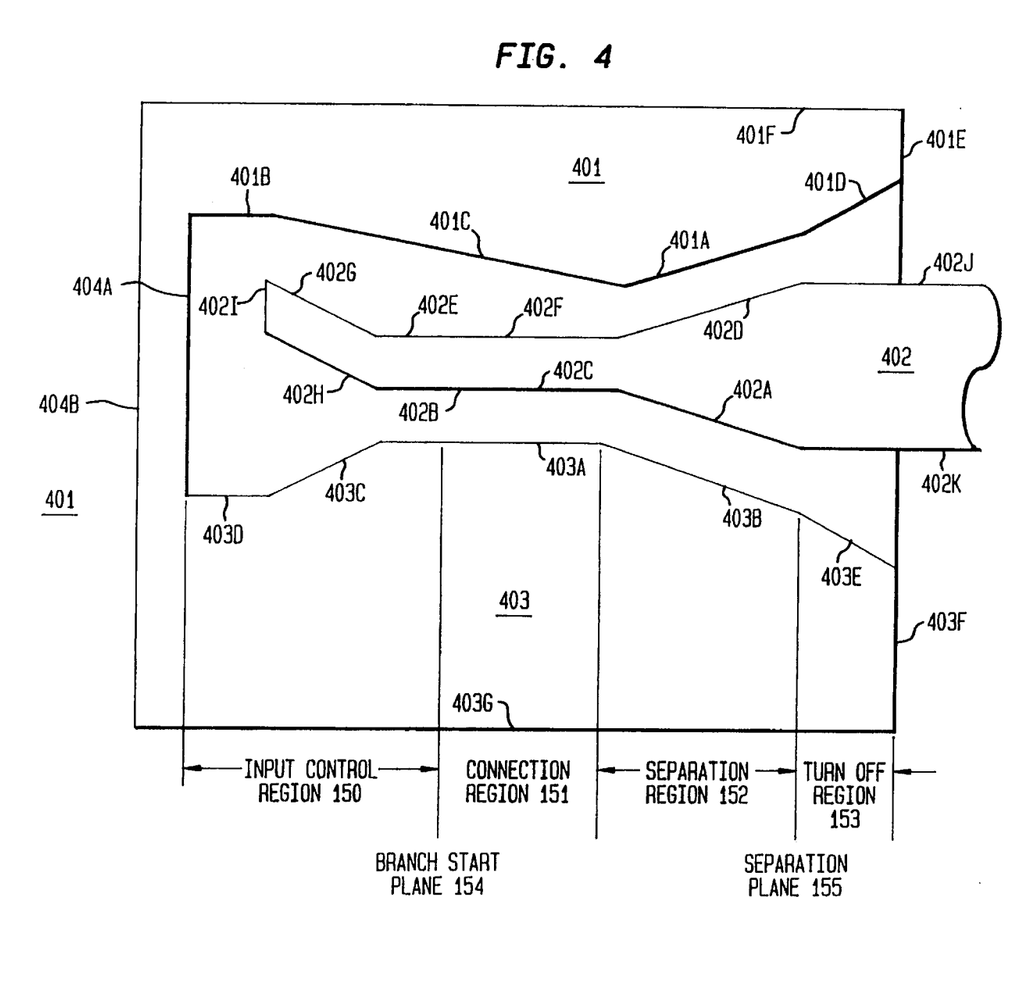
FIG. 4 illustrates an electrode configuration according to a preferred embodiment of the present invention.

The electrode configuration 400 according to a preferred embodiment of the present invention is described ill detail in FIG. 4. FIG. 4 illustrates the same regions, input control region 150, connection region 151, separation region 152, and turn off region 153 as described previously in FIGS. 1A and 5A. In addition, FIG. 4 illustrates the branch start plane 154 and separation plane 155 as previously described in FIGS. 1A and 5A. The positioning of the electrode configuration 400 relative to the y-shaped optical switch 101 is shown in FIG. 4. The electrode configuration 400 further comprises three electrodes 401, 402, and 403 as shown in FIG. 4. Electrode 401 further comprises edges 401A, 401B, 401C, 401D, 401E, and 401F. Electrode 402 further comprises edges 402A, 402B, 402C, 402D, 402E, 402F, 402G, 402H, 402I, 402J, and 402K. Electrode 403 further comprises edges 403A, 403B, 403C, 403D, 403E, 403F, and 403G. The direction symbols N, S, E, and W represent north, south, east, west and denote the relative positioning of elements in FIG. 4.

FIG. 4 is now explained in detail. Edge 402A begins at the separation plane 155, preferably 3 μm northeast of the upper edge 112 of the lower branch 108 of the y-shaped optical waveguide 101. It runs parallel to the upper edge 112 of the lower branch 108 of the y-shaped optical waveguide 101 and ends at the first intersection with the lower edge 111 of the upper branch 107 of the y-shaped optical waveguide 101. Edge 402B is preferably 300 μm long. It begins at the branch start plane 154 and runs preferably 300 μm, parallel to the upper edge 114 of the input 102 of y-shaped optical waveguide 101. It is preferably ¾ μm south of the upper edge 114 of the input 102 of the y-shaped optical waveguide 101 edge 100. Edge 403A begins preferably ¾ μm north of the lower edge 115 of the input 102 of the y-shaped optical waveguide 101 and preferably 300 μm to the west of the branch start plane 154. It runs substantially parallel to the input 102 of the y-shaped optical waveguide 101 until it intersects with edge 403B. Edge 403B begins at the separation plane 155, preferably 2 μm southwest of the upper edge 112 of the lower branch 108 of the y-shaped optical waveguide 101. It runs substantially parallel to the upper edge 112 of the lower branch 108 of the y-shaped optical waveguide 101 until it intersects edge 403A. Edge 402C connects edges 402B and 402A. Edges 401A and 402D run substantially parallel to the upper edge 110 of the upper branch 107 of the y-shaped optical waveguide 101. Edge 402D is preferably 2 μm southeast of the upper edge 110 of the upper branch 107 of the y-shaped optical waveguide 101. Edge 401A is preferably 3 μm northwest of the upper edge 110 of the upper branch 107 of the y-shaped optical waveguide 100. Both edges begin at the separation plane 155 and run southwest, stopping along the same plane as the end of edge 402A. Edge 402E is substantially parallel to and preferably 5 μm away from edge 402B. Edge 402F connects edges 402E and 402D. Edges 402G and 402H are substantially parallel and preferably 5 μm apart. They run to the northwest, preferably 5 μm north and 500 μm west. Therefore edges 402G and 402H preferably have a northwest to the southeast slope of 0.01. A northwest to southeast slope is known as a negative slope in the relevant art. Edge 402I connects edges 402G and 402H. Edge 403C runs southwest, preferably 5 μm south and 500 μm west. Therefore, edge 403C preferably has a northeast to the southwest slope of 0.01. A southwest to northeast slope is known as a positive slope in the relevant art. Thus, edges 402H and 403C have substantially equal and opposite slopes in the input control region 150, thereby forming a smoothly (linearly, according to a preferred embodiment of the present invention) decreasing gap between them in the input control region 150. Edge 403D is substantially parallel to the lower edge 115 of the input 102 of the y-shaped optical waveguide 101 and preferably 400 μm long. Edge 401B is substantially parallel to edge 403D and preferably 26 μm north of edge 403D. Edge 401C connects edge 401A to edge 401B. Edge 404A connects edge 401B to edge 403D. Edge 404B is substantially parallel to edge 404A and preferably 200 μm west of edge 404A. It runs preferably 34 μm north from and 28 μm south from a center line 104 of the input of the y-shaped optical waveguide 101. Edge 401D starts at the eastmost end of edge 401A and runs preferably 5 μm north and 500 μm east. Thus, edge 401D preferably has a southwest to northeast, i.e., positive, slope of 0.01. Edge 401E runs from the eastmost end of edge 401D to a point preferably 34 μm from the center line 104 of the input of the y-shaped optical waveguide 101. Edge 401F connects edge 404B to edge 401E. Edges 402J and 402K are substantially parallel to each other and the upper edge of the input 102 of the y-shaped optical waveguide 101 and run east from the eastmost ends of edges 402D and 402A, respectively. Edges 402J and 402K are used to connect the device to bond pads. Edge 403E begins at the eastmost end of edge 403B and runs preferably 500 μm east and 5 μm south. Thus, edge 403E preferably has a northwest to southeast, i.e., negative, slope of 0.01. Edge 403F begins at edge 403E and runs to a point preferably 28 μm south of the center line 104 of the y-shaped optical waveguide 101. Edge 403G connects edges 404B and 403F.

Voltage differences between electrodes 401, 402, and 403 create an electric field between the electrodes 401, 402, and 403. The electric field thus generated is illustrated in FIG. 3. FIG. 3 is the same cross sectional view illustrated in FIG. 6. In FIG. 3 electric field lines 302, generated by voltage differences between the electrodes, are illustrated. The electric field lines 302 are directed perpendicular to the electrode configuration plane 303, and pass through the optical waveguide branches 107, and 108. The desired direction of the electric field is due to the crystalline structure of the substrate on which the electrodes 401, 402, and 403 are formed. In the preferred embodiment, the crystal is Z-cut lithium niobate ($LiNO_3$). Voltage applied to Z-cut $LiNO_3$ generates electric field lines 302 down into the z-cut $LiNO_3$ crystal and through the optical waveguide 100 as shown in FIG. 3.

The present invention provides smooth application of the applied voltage in the input control region 150. In the input control region 150 the applied field is predominantly controlled by the electrodes 402 and 403. This is because, as shown in FIG. 5A, the y-shaped optical waveguide 101 is positioned generally between electrodes 402 and 403 in the input control region 150. Thus, the electric field lines, as shown in FIG. 3, from the voltage between electrodes 401 and 402 has little, if any, effect on the y-shaped optical waveguide 101 in the input control region 150. The applied electric field is controlled by decreasing the gap between the electrodes in a smooth manner. As described above, the strength of the applied field varies as V/L. Therefore, as the spacing between electrodes 402 and 403, L, decreases, the electric field strength increases. The smoothly (linearly, according to a preferred embodiment of the present invention) decreasing gap is bounded by edges 402H and 403C in FIG. 4. Thus, because the electric field strength varies as V/L, the electric field is increased smoothly, in the input control region 150. The electric field is then maintained constant until the branch start plane 154 as shown by the substantially constant gap defined by edges 402B and 403A until the beginning of the branch start plane 154. Thus, light propagating in the waveguide experiences a gradual turn-on of the electric field through the input control region 150 of the y-shaped waveguide 101.

The electric field reaches an equal value in each branch 107 and 108 in the separation region 152. In a preferred embodiment of the present invention, the optical switch 500 is manufactured from a birefringent material such as lithium niobate (LiNO$_3$). As a result, an electric field may be applied to the branches 107 and 108, such that the electric field promotes light mode propagation in one of the branches 107 or 108 and inhibits light mode propagation in the other of the branches 107 or 108. In addition, the branches 107 and 108 are coupled. Therefore, the power in the inhibited branch 107 or 108 is substantially fully transferred to the promoting branch 107 or 108. Therefore, when light reaches the end of the separation region 152, it will continue to propagate through only one of the branches 107 or 108.

A substantially constant electric field is applied to the branches 107 and 108 of the y-shaped optical waveguide 101 in the separation region 152. Electrodes 401 and 402 maintain a substantially constant spacing in the separation region 152. This substantially constant spacing between electrodes 401 and 402 is illustrated in FIG. 4 by edges 401A and 402D. Also, electrodes 402 and 403 maintain a constant spacing in the separation region 152. This substantially constant separation between electrodes 402 and 403 is illustrated in FIG. 4 by edges 402A and 403B. The spacing between electrodes 401 and 402 is substantially equal to the spacing between electrodes 402 and 403. The substantially constant spacing between electrodes 401 and 402 and electrodes 402 and 403 generates a substantially constant electric field through the optical waveguide branches 107 and 108 in the separation region 152. Optical outputs are taken at the end of the branches 107 and 108 of the y-shaped optical waveguide 101 at the separation plane 155. Maintaining a substantially constant electric field in the separation region 152, allows the electrode design of the optical switch of the present invention to incorporate the voltage-length reduction techniques, such as one described in W. K. Burns, "Shaping the Digital Switch," *IEEE Photonics Technology Letters*, Vol. 4., pp. 861–863, August 1992.

The electric field is turned off in a smooth manner after the light mode has propagated beyond the separation plane 155 and into the turn off region 153. Smooth turn off of the electric field is accomplished by smoothly increasing the spacing, L, between the electrodes 401 and 402 and electrodes 402 and 403 in the turn off region 153. The smoothly (linearly, according to a preferred embodiment of the present invention) increasing spacing between electrodes 401 and 402 is illustrated in FIG. 4 by edges 401D and 402J. The smoothly (linearly, according to a preferred embodiment of the present invention) increasing spacing between electrodes 402 and 403 is illustrated in FIG. 4 by edges 402K and 403E. The smooth turn off, like the smooth turn on, avoids disturbing the propagation of light in the waveguide.

Edge 402D is offset from the upper edge 110 of the upper branch 107 of the y-shaped optical waveguide 100. Edge 403B is offset from the upper edge 112 of the lower branch 108 of the y-shaped optical waveguide 100. Offsetting the edges of the electrodes 401,402, and 403 optimizes the electro-optic effect of the applied electric field. This optimization is described in Marcuse, "Optimal Electrode Design for Integrated Optics Modulators," *IEEE Journal of Quantum Electronics*, Vol. QE-18, pp. 393–398, March 1982.

The operation of the optical switch, designed according to the present invention, is now explained. Light enters the y-shaped optical waveguide 101 at its input 102. The electrodes 401,402, and 403 are designed to apply a smoothly (linearly, according to a preferred embodiment of the present invention) increasing electric field to the y-shaped optical waveguide 101. The electrodes 401,402, and 403 smoothly increase the electric field. As will be appreciated by persons skilled in the relevant art, the input control region 150 is the optimum point at which to begin application of the electric field. The reason is two-fold. First, crosstalk at the separation plane 155 is reduced. Second, propagating light is disturbed less if the electric field is turned on smoothly in the input control region 150, rather than abruptly at a point further down the path of light propagation.

Light propagating through the optical waveguide 101 enters the connection region 151. The electrode design of the connection region 151 is primarily to connect the electrodes from the input control region 150 to the separation region 152. Connection in a smooth manner, as previously described, minimizes disturbing light propagating through the y-shaped optical waveguide 101 and minimizes crosstalk appearing at the output of the y-shaped optical waveguide 101 at the separation plane 155.

In the connection region 151, two nodes may appear due to the larger width in the y-shaped optical waveguide 101 where the y-shaped optical waveguide 101 begins to branch apart, i.e., the branch start plane 154. Because the y-shaped optical waveguide 101 is a single mode optical waveguide, only a single mode of light will exist on the branches 107 and 108 and in the input 102.

If no control voltage and, therefore, no electric field, is present across the y-shaped optical waveguide 101 branches 107 and 108, then equal amounts of light appear at the end of branches 107 and 108 of the y-shaped optical waveguide 100. The optical output of the digital optical switch can be taken at the separation plane 155. A control voltage (V) is applied to the branches 107 and 108 of the optical waveguide 100 to generate an electric field, which changes the index of refraction of the branches 107 and 108 of the optical waveguide 101, by the electro-optic effect, The index of refraction is changed such that light mode propagation is promoted in one of the branches 107 or 108 and inhibited in the other branch 107 or 108 of the optical waveguide 100.

In a preferred embodiment, the branches 107 and 108 are coupled. Therefore, the power of the light in the inhibiting branch is transferred to the promoting branch. As a result all of the power of the input light mode is switched into the promoting branch at the end of the separation region 152.

As an example of a first application of voltage, suppose that a first voltage (V/2) is applied to electrodes 401 and 403. V can range from 1 to 100 volts. Assume further, that a second voltage (−V/2) is applied to electrode 402. In this case, light propagating through the upper branch 107 of the y-shaped optical waveguide 101 is promoted. A light mode propagating in the lower branch 108 of the optical waveguide 101 is inhibited. Furthermore, because branches 107 and 108 of the optical waveguide 101 are coupled, the power of the light mode in the inhibiting lower branch 108 of the optical waveguide 101 is transferred to the promoting upper branch 107 of the optical waveguide 101. According to a second embodiment of the present invention, the polarities of the voltages on the electrodes 401, 402, and 403 are reversed, i.e., V/2 is applied to electrode 402 and −V/2 is applied to electrodes 401 and 403. In this case, upper branch 107 of the optical waveguide 101 inhibits light propagating through it. Lower branch 108 of the optical waveguide 101, on the other hand, promotes light propagating through it. Furthermore, because branches 107 and 108 of the optical waveguide 100 are coupled, the power of the light mode in the inhibiting upper branch 107 of the optical waveguide 101 is transferred to the promoting lower branch 108 of the optical waveguide 101. Therefore, digital switching, that is, routing of the input to one of two outputs, is accomplished by the design of the present invention.

The voltages applied to the electrodes of the present invention are not constrained to +/−V/2. According to a third embodiment, voltage is applied so as to hold electrode 402 at ground or hold electrodes 401 and 403 at ground. The A value of +V or −V is applied to the electrodes not held to ground. In order to properly change the index of refraction, the voltage on the electrodes not held to ground reverses polarity, i.e. swings from +V to −V or from −V to +V. The change in voltage causes the index of refraction of the branches 107 and 108 to change such that digital switching, as described above, is achieved. Note, however, that the total voltage swing is twice V volts. Using the first embodiment, the voltage swing is only V volts. The V voltage swing of the first embodiment is preferable to the twice V voltage swing of the second embodiment because such a swing is accomplished faster and therefore can be used for higher data rate switching requirements.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A digital optical switch comprising:
   (1) an optical waveguide, positioned in a first plane, having an input control region, a connection region, a separation region, and a turn off region; and
   (2) an electrode configuration, positioned in a second plane, substantially parallel to and distinct from said first plane, for generating an electric field through said optical waveguide, said electrode configuration smoothly increasing an intensity of an electric field along a first length of said input control region to said separation region, said electrode configuration generating a substantially constant electric field along a second length of said separation region.

2. The digital optical switch of claim 1, wherein said optical waveguide is a y-shaped optical waveguide, having an upper branch and a lower branch.

3. The digital optical switch of claim 2, wherein said electrode configuration further comprises:
   (a) a first electrode;
   (b) a second electrode; and
   (c) a third electrode interposed between said first electrode and said second electrode;
   said third electrode having a negatively sloping edge over said input control region of said y-shaped optical waveguide, said second electrode having a positively sloping edge over said input control region of said y-shaped optical waveguide, wherein the magnitude of the negative slope of said negatively sloping edge of said third electrode is substantially equal to the magnitude of said positive slope of said positively sloping edge of said second electrode, said sloping edges of said first electrode and said third electrode approaching, but not intersecting, each other.

4. The digital optical switch of claim 2, wherein said electrode configuration further comprises:
   (a) a first electrode;
   (b) a second electrode; and
   (c) a third electrode interposed between said first electrode and said second electrode;
   said first electrode and said third electrode having substantially parallel first facing edges in said separation region of said optical waveguide and said first facing edges being substantially parallel to said upper branch of said y-shaped optical waveguide, and said second and said third electrode having substantially parallel second facing edges in said separation region and said second facing edges being substantially parallel to said lower branch of said y-shaped optical waveguide.

5. The digital optical switch of claim 1 wherein said optical waveguide is an x-shaped optical waveguide, having an upper branch and a lower branch.

6. The digital optical switch of claim 5 wherein said electrode configuration further comprises:
   (a) a first electrode;
   (b) a second electrode; and
   (c) a third electrode interposed between said first electrode and said second electrode;
   said third electrode having a negatively sloping edge over said input control region of said x-shaped optical waveguide, said second electrode having a positively sloping edge over said input control region of said x-shaped optical waveguide, wherein the magnitude of the negative slope of said negatively sloping edge of said third electrode is substantially equal to the magnitude of said positive slope of said positively sloping edge of said second electrode, said sloping edges of said first electrode and said third electrode approaching, but not intersecting, each other.

7. The digital optical switch of claim 6 wherein said electrode configuration further comprises: (a) a first electrode; (b) a second electrode; and (c) a third electrode interposed between said first electrode and said second electrode;
   said first electrode and said third electrode having substantially parallel first facing edges in said separation region of said optical waveguide and said first facing edges being substantially parallel to said upper branch of said y-shaped optical waveguide, and said second and said third electrode having substantially parallel second facing edges in said separation region and said second facing edges being substantially parallel to said lower branch of said x-shaped optical waveguide.

8. A method for optical digital switching comprising the steps of:

(a) inputting light into a optical waveguide having an input control region, a connection region, a separation region, and a turn off region;

(b) smoothly applying an electric field to said input control region of said optical waveguide such that light propagating through said optical waveguide is not affected in an abrupt manner by said smoothly applied electric field; and (c) applying a constant electric field to said separation region of said optical waveguide.

9. An electrode configuration for use in an optical switch, comprising:

(1) a plurality of electrodes, for generating an electric field through an optical waveguide, positioned in a first plane, said electrode configuration positioned in a second plane substantially parallel to and distinct from said first plane, and said electrode configuration smoothly increasing an intensity of an electric field along a first length of said input control region to said separation region, said electrode configuration generating a substantially constant electric field along a second length of said separation region.

10. The electrode configuration of claim 9 further comprising:

(a) a first electrode;

(b) a second electrode; and (c) a third electrode interposed between said first electrode and said second electrode;

said first electrode and said third electrode having substantially parallel first facing edges in said separation region of said optical waveguide and said first facing edges being substantially parallel to said upper branch of said y-shaped optical waveguide, and said second and said third electrode having substantially parallel second facing edges in said separation region and said second facing edges being substantially parallel to said lower branch of said x-shaped optical waveguide.

11. The electrode configuration of claim 9, further comprising:

(a) a first electrode;

(b) a second electrode; and (c) a third electrode interposed between said first electrode and said second electrode;

said third electrode having a negatively sloping edge over said input control region of said y-shaped optical waveguide, said second electrode having a positively sloping edge over said input control region of said y-shaped optical waveguide, wherein the magnitude of the negative slope of said negatively sloping edge of said third electrode is substantially equal to the magnitude of said positive slope of said positively sloping edge of said second electrode, said sloping edges of said first electrode and said third electrode approaching, but not intersecting, each other.

* * * * *